(12) United States Patent
Chen et al.

(10) Patent No.: US 12,461,748 B1
(45) Date of Patent: Nov. 4, 2025

(54) METHOD AND APPARATUS FOR ENCODING OF PROCESSOR INSTRUCTION SET

(71) Applicant: Cadence Design Systems, Inc., San Jose, CA (US)

(72) Inventors: Rong Chen, Fremont, CA (US); He Xiao, Campbell, CA (US); Nenad Nedeljkovi, Mountain View, CA (US); Dan Nicolaescu, Sacramento, CA (US); James Kim, San Jose, CA (US); Jiayuan Chen, San Jose, CA (US)

(73) Assignee: Cadence Design Systems, Inc., San Jose, CA (US)

( * ) Notice: Subject to any disclaimer, the term of this patent is extended or adjusted under 35 U.S.C. 154(b) by 103 days.

(21) Appl. No.: 17/941,992

(22) Filed: Sep. 9, 2022

(51) Int. Cl.
| | |
|---|---|
| *G06F 9/30* | (2018.01) |
| *G06F 8/33* | (2018.01) |
| *G06F 8/41* | (2018.01) |
| *G06F 9/32* | (2018.01) |
| *G06F 9/38* | (2018.01) |
| *G06F 30/30* | (2020.01) |

(52) U.S. Cl.
CPC ............ *G06F 9/30181* (2013.01); *G06F 8/33* (2013.01); *G06F 8/447* (2013.01); *G06F 8/4434* (2013.01); *G06F 9/30109* (2013.01); *G06F 9/30167* (2013.01); *G06F 9/323* (2023.08); *G06F 9/3893* (2013.01); *G06F 30/30* (2020.01)

(58) Field of Classification Search
CPC ............ G06F 9/30109; G06F 9/30167; G06F 8/4434; G06F 9/3893; G06F 8/33; G06F 30/30; G06F 9/30181; G06F 9/323
See application file for complete search history.

(56) References Cited

U.S. PATENT DOCUMENTS

| | | | | |
|---|---|---|---|---|
| 6,083,278 | A * | 7/2000 | Olson | G06F 8/33 |
| | | | | 717/113 |
| 2003/0208723 | A1* | 11/2003 | Killian | G06F 30/30 |
| | | | | 716/102 |
| 2003/0225998 | A1* | 12/2003 | Khan | G06F 9/323 |
| | | | | 712/210 |
| 2004/0015931 | A1* | 1/2004 | Larin | G06F 9/30167 |
| | | | | 712/E9.028 |

(Continued)

OTHER PUBLICATIONS

Stephens et al, TW 202205086 (translation), Feb. 1, 2022, 37 pgs <TW_202205086.pdf>.*

(Continued)

*Primary Examiner* — Tuan A Vu
(74) *Attorney, Agent, or Firm* — Foley & Lardner LLP

(57) ABSTRACT

An approach of the present disclosure includes an algorithm to encode an instruction set of a domain-specific processor automatically in an optimal way, and which yields area-effective hardware. Instruction operands and opcodes can be encoded separately or at the same time. Instructions are not encoded one by one but can be encoded in groups, and instructions are grouped automatically. The decoding logic of control signals for each group of instructions, such as register read enable and write enable, is fed to a logic minimizer to obtain an encoding constraint matrix, and the encoding of each instruction in each instruction group is done using an optimal state assignment method.

20 Claims, 18 Drawing Sheets

(56) References Cited

U.S. PATENT DOCUMENTS

| | | | |
|---|---|---|---|
| 2004/0117601 A1* | 6/2004 | Spracklen | G06F 9/3893 |
| | | | 712/E9.071 |
| 2006/0174089 A1* | 8/2006 | Altman | G06F 9/30181 |
| | | | 712/E9.035 |
| 2016/0342417 A1* | 11/2016 | Uliel | G06F 9/30109 |
| 2020/0349465 A1* | 11/2020 | Hechtman | G06F 8/4434 |

OTHER PUBLICATIONS

Li et al, CN 106371807, (translation), Feb. 1, 2017, 22 pgs <CN 106371807.pdf>.*

* cited by examiner

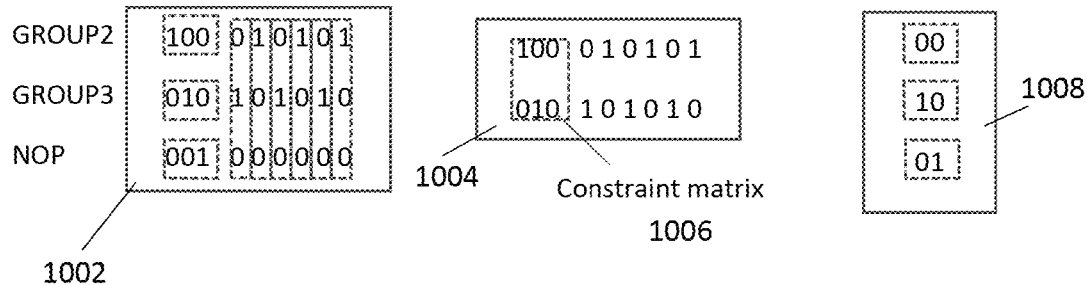

| | | | |
|---|---|---|---|
| Decoding input to logic minimizer | Decoding output from logic minimizer | Optimal encoding | |

GROUP2  `100 0 1 0 1 0 1`
GROUP3  `010 1 0 1 0 1 0`
NOP     `001 0 0 0 0 0 0`
1002

`100 0 1 0 1 0 1`
`010 1 0 1 0 1 0`
1004   Constraint matrix
1006

`00`
`10`  1008
`01`

```
LVI vd ([14:10], rs([3:0], imm8([16:15,9:4])                         op3 ([17]=1'b0)  op4 ([19:18]=2'b01)
SVI vs ([14:10], rs([3:0], imm8([16:9])                              op3 ([17]=1'b1)  op4 ([19:18]=2'b01)

MOV vd ([14:10]) vs ([4:0])         op1 ([5]=1'b0)   op2 ([17:15]=3'b100)              op4 ([19:18]=2'b00)
NEG vd ([14:10]) vs ([4:0])         op1 ([5]=1'b1)   op2 ([17:15]=3'b100)              op4 ([19:18]=2'b00)
ADD vd ([14:10]) vs (14:10) vr([8:5])                op2 ([17:15]=3'b000)              op4 ([19:18]=2'b00)
AND vd ([14:10]) vs (14:10) vr([8:5])                op2 ([17:15]=3'b001)              op4 ([19:18]=2'b00)
OR  vd ([14:10]) vs (14:10) vr([8:5])                op2 ([17:15]=3'b010)              op4 ([19:18]=2'b00)
SLLI vd ([14:10]) vr ([4:0]) imm4([8:5               op2 ([17:15]=3'b101)              op4 ([19:18]=2'b00)
SUB vd ([9:5]) vs (14:10) vr([8:5])                  op2 ([17:15]=3'b011)              op4 ([19:18]=2'b00)

NOP                                                                                    op4 ([19:18]=2'b10)
```

*FIG. 10*

```
regfile vec 512 32 v vector_pipe gr 4 {vec} immediate_range imm8 -128 16192 64                    ⟵ 1102 operation LVI {out vec vr, in AR* rs, in imm8 i_imm8} {in VectorMemDataIn512, out VAddr} { assign VAddr = rs + i_imm8;

wire [511:0] datain = VectorMemDataIn512;

assign vr = {datain};

}                                                     ⟵ 1104 operation SVI {in vec vr, in AR* rs, in imm8 i_imm8} {out VectorMemDataOut512, out VAddr} { assign VAddr = rs + i_imm8;

wire [511:0] dataout = vr[511:0];

assign VectorMemDataOut512 = dataout;

}                                                     ⟵ 1106 operation MOV {out vec vd, in vec vr} {} { assign vd = vr;

} module add{out [31:0] o, in [31:0] a, in [31:0] b} { assign o = a + b;

} operation ADD{out vec vd, in vec vs, in vec vr}{} { add #(16) i0(vd, vs, vr);

```
module sub(out [31:0] o, in [31:0] a, in [31:0] b) {
  assign o = a - b;
}
operation NEG{out vec vd, in vec vr}{} {
  assign vd = 32'b0 - vr;
}
operation SUB{out vec vd, in vec vs, in vec vr}{} {
  sub #(16) i0(vd, vs, vr);
}
module neg(out [31:0] o, in [31:0] i) {
  assign o = 32'b0 - i;
}
module sll(out [31:0] o, in [31:0] i, in [4:0] sa) {
  assign o = i << sa;
}
immediate_range imm4 1 15 1
operation SLLI{out vec vd, in vec vr, in imm4 i_imm4}{} {
  sll #(16) i0(vd, vr, 16{i_imm4[4:0]});
}
semantic sem_alu{ADD, SUB} {
  wire is_sub = SUB;
  wire [511:0] vs_neg;
  neg #(16) i0(vs_neg, vs);
  wire [511:0] op1 = vr;
  wire [511:0] op2 = is_sub ? vs_neg : vs;
  add #(16) i1(vd, op2, op1); }
```

FIG. 11B

```
module and(out [31:0] o, in [31:0] a, in [31:0] b) {
    assign o = a & b;
}
operation AND{out vec vd, in vec vs, in vec vr}{} {
    and #(16) i0(vd, vs, vr);
}
module or(out [31:0] o, in [31:0] a, in [31:0] b) {
    assign o = a | b;
}
operation OR{out vec vd, in vec vs, in vec vr}{} {
    or #(16) i0(vd, vs, vr);
}
semantic sem_logic{AND, OR} {
    wire [511:0] o_and;
    wire [511:0] o_or;
    and #(16) i0(o_and, vs, vr);
    or #(16) i1(o_or, vs, vr);
    assign vd = OR ? o_or : o_and;
}
format userformat 32 {myslot1}
slot_opcodes myslot1 {ADD, SUB, NEG, AND, OR, SLLI, LVI, SVI, MOV}
```

FIG. 11C

```
module vec_decoder (
InstBuf_C0,
InstBuf_C1,
rd0_use10_C0,
rd0_use11_C0,
rd1_use10_C0,
wr0_def9_C1,
wr0_def10_C1
);
input [31:0] InstBuf_C0;
input [31:0] InstBuf_C1;
output rd0_use10_C0;
output rd0_use11_C0;
output rd1_use10_C0;
output wr0_def9_C1;
output wr0_def10_C1;

wire rd0_use10_C0;
  wire rd0_use11_C0;
  wire rd1_use10_C0;
  assign rd1_use10_C0 = 1'b0
    | ({InstBuf_C0[31:19], InstBuf_C0[3:0]}==17'h0008e /*add*/)
    | ({InstBuf_C0[31:19], InstBuf_C0[3:0]}==17'h0009e /*and*/)
    | ({InstBuf_C0[31:19], InstBuf_C0[3:0]}==17'h000ae /*or*/)
    | ({InstBuf_C0[31:19], InstBuf_C0[3:0]}==17'h000be /*sub*/)
  ;
```

FIG. 12A

```
assign rd0_use11_C0 = 1'b0
    | ({InstBuf_C0[31:21], InstBuf_C0[3:0]}==15'h001e /*svi*/)
;

assign rd0_use10_C0 = 1'b0
    | ({InstBuf_C0[31:19], InstBuf_C0[3:0]}==17'h0008e /*add*/)
    | ({InstBuf_C0[31:19], InstBuf_C0[3:0]}==17'h0009e /*and*/)
    | ({InstBuf_C0[31:19], InstBuf_C0[13:9], InstBuf_C0[3:0]}==22'h00190e /*mov*/)
    | ({InstBuf_C0[31:19], InstBuf_C0[13:9], InstBuf_C0[3:0]}==22'h00191e /*neg*/)
    | ({InstBuf_C0[31:19], InstBuf_C0[3:0]}==17'h000ae /*or*/)
    | ({InstBuf_C0[31:19], InstBuf_C0[13], InstBuf_C0[3:0]}==18'h0018e /*SLLI*/)
    | ({InstBuf_C0[31:19], InstBuf_C0[3:0]}==17'h000be /*sub*/)
;

wire wr0_def9_C1;
wire wr0_def10_C1;
assign wr0_def9_C1 = 1'b0
    | ({InstBuf_C1[31:21], InstBuf_C1[3:0]}==15'h000e /*lvi*/)
;

assign wr0_def10_C1 = 1'b0
    | ({InstBuf_C1[31:19], InstBuf_C1[3:0]}==17'h0008e /*add*/)
    | ({InstBuf_C1[31:19], InstBuf_C1[3:0]}==17'h0009e /*and*/)
    | ({InstBuf_C1[31:19], InstBuf_C1[13:9], InstBuf_C1[3:0]}==22'h00190e /*mov*/)
    | ({InstBuf_C1[31:19], InstBuf_C1[13:9], InstBuf_C1[3:0]}==22'h00191e /*neg*/)
    | ({InstBuf_C1[31:19], InstBuf_C1[3:0]}==17'h000ae /*or*/)
    | ({InstBuf_C1[31:19], InstBuf_C1[13], InstBuf_C1[3:0]}==18'h0018e /*SLLI*/)
    | ({InstBuf_C1[31:19], InstBuf_C1[3:0]}==17'h000be /*sub*/)
;

Endmodule
```

FIG. 12B

InstBuf_C0,

InstBuf_C1, rd0_use10_C0, rd0_use11_C0, rd1_use10_C0, wr0_def9_C1, wr0_def10_C1
    );

input [127:0] InstBuf_C0;

input [127:0] InstBuf_C1;

output rd0_use10_C0;

output rd0_use11_C0;

output rd1_use10_C0;

output wr0_def9_C1;

output wr0_def10_C1;

wire rd0_use10_C0;

wire rd0_use11_C0;

wire rd1_use10_C0;

assign rd1_use10_C0 = 1'b0

| ({InstBuf_C0[31:19], InstBuf_C0[3:0]}==17'h0000e /*add*/)

| ({InstBuf_C0[31:19], InstBuf_C0[3:0]}==17'h0001e /*and*/)

| ({InstBuf_C0[31:19], InstBuf_C0[3:0]}==17'h0002e /*or*/)

| ({InstBuf_C0[31:19], InstBuf_C0[3:0]}==17'h0003e /*sub*/)

*assign rd0_use11_C0 = 1'b0*

*| ({InstBuf_C0[31:21], InstBuf_C0[3:0]}==15'h003e /\*svi\*/)*

*;*

*assign rd0_use10_C0 = 1'b0*                                          — 1302

*| ({InstBuf_C0[31:19], InstBuf_C0[3:0]}==17'h0000e /\*add\*/)*

*| ({InstBuf_C0[31:19], InstBuf_C0[3:0]}==17'h0001e /\*and\*/)*

*| ({InstBuf_C0[31:19], InstBuf_C0[9], InstBuf_C0[3:0]}==18'h0008e /\*mov\*/)*

*| ({InstBuf_C0[31:19], InstBuf_C0[9], InstBuf_C0[3:0]}==18'h0009e /\*neg\*/)*

*| ({InstBuf_C0[31:19], InstBuf_C0[3:0]}==17'h0002e /\*or\*/)*

*| ({InstBuf_C0[31:19], InstBuf_C0[3:0]}==17'h0005e /\*SLLI\*/)*

*| ({InstBuf_C0[31:19], InstBuf_C0[3:0]}==17'h0003e /\*sub\*/)*

*;*

*wire wr0_def9_C1;*

*wire wr0_def10_C1;*

*assign wr0_def9_C1 = 1'b0*

*| ({InstBuf_C1[31:21], InstBuf_C1[3:0]}==15'h002e /\*lvi\*/)*

*;*

*assign wr0_def10_C1 = 1'b0*

*| ({InstBuf_C1[31:19], InstBuf_C1[3:0]}==17'h0000e /\*add\*/)*

*| ({InstBuf_C1[31:19], InstBuf_C1[3:0]}==17'h0001e /\*and\*/)*

*| ({InstBuf_C1[31:19], InstBuf_C1[9], InstBuf_C1[3:0]}==18'h0008e /\*mov\*/)*

*| ({InstBuf_C1[31:19], InstBuf_C1[9], InstBuf_C1[3:0]}==18'h0009e /\*neg\*/)*

*| ({InstBuf_C1[31:19], InstBuf_C1[3:0]}==17'h0002e /\*or\*/)*

*| ({InstBuf_C1[31:19], InstBuf_C1[3:0]}==17'h0005e /\*SLLI\*/)*

*| ({InstBuf_C1[31:19], InstBuf_C1[3:0]}==17'h0003e /\*sub\*/)*

*;*

*endmodule;*

FIG. 13B

METHOD AND APPARATUS FOR ENCODING OF PROCESSOR INSTRUCTION SET

TECHNICAL FIELD

The present embodiments relate generally to computer processing and more particularly to methods and apparatuses for encoding an instruction set for a domain specific processor architecture, such as an architecture based on a configurable and/or extensible processor having application-specific processor instructions.

BACKGROUND

With general-purpose processors, the number of instruction formats and instructions in each format is relatively small; furthermore, the instruction set of general-purpose processors is quite stable and once it is defined it doesn't change much. It is possible to design those instruction formats and assign opcodes to each instruction manually with minimal automation.

With domain specific architectures (e.g. processor architectures based on configurable/extensible processors), the size and complexity of the instruction set can vary according to application. For high performance and high energy efficiency, many application-specific instructions can be created, and the overall number of instructions in such architectures can be very large. So it is often not feasible to design instruction formats and map instruction encodings in such applications manually. For example, the encoding space of an instruction set is a binary tree and the encoding of each instruction is one leaf node on that binary tree. The manual process of mapping each instruction to the opcode space is to find a leaf node from the binary tree. To encode each instruction, both operand and opcode need to be encoded. The operands and number of bits needed by operands for each instruction could be different. To find a leaf node from the binary tree to allocate both operand and opcode is tricky and there is presently no efficient algorithm to do that.

It is against this technological backdrop that the present Applicant sought a technological solution to these and other problems rooted in this technology.

SUMMARY

The present embodiments relate to a method and apparatus to encode an instruction set of a domain-specific processor automatically in an optimal way, and which yields area-effective hardware. Instruction operands and opcodes can be encoded separately or at the same time. Instructions are not encoded one by one but can be encoded in groups, and instructions are grouped automatically. The decoding logic of control signals for each group of instructions, such as register read enable and write enable, is fed to a logic minimizer to obtain an encoding constraint matrix, and the encoding of each instruction in each instruction group is done using an optimal state assignment method.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein:

FIG. 7 to FIG. 10 illustrate an example encoding process for opcodes for different example groups of instructions according to embodiments.

FIGS. 11A to 11C illustrate an example list of instruction descriptions for an example instruction set to be encoded according to embodiments.

FIGS. 12A and 12B are Verilog descriptions of an instruction decoder in connection with using a conventional encoding method.

FIGS. 13A and 13B are Verilog descriptions of an instruction decoder in connection with using an instruction encoding method according to embodiments.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain general aspects, the present embodiments provide a method, algorithm, and software for automatically encoding an instruction set of a domain specific architecture in an optimal way, and/or in a way which yields area-effective hardware.

Figure 1A:
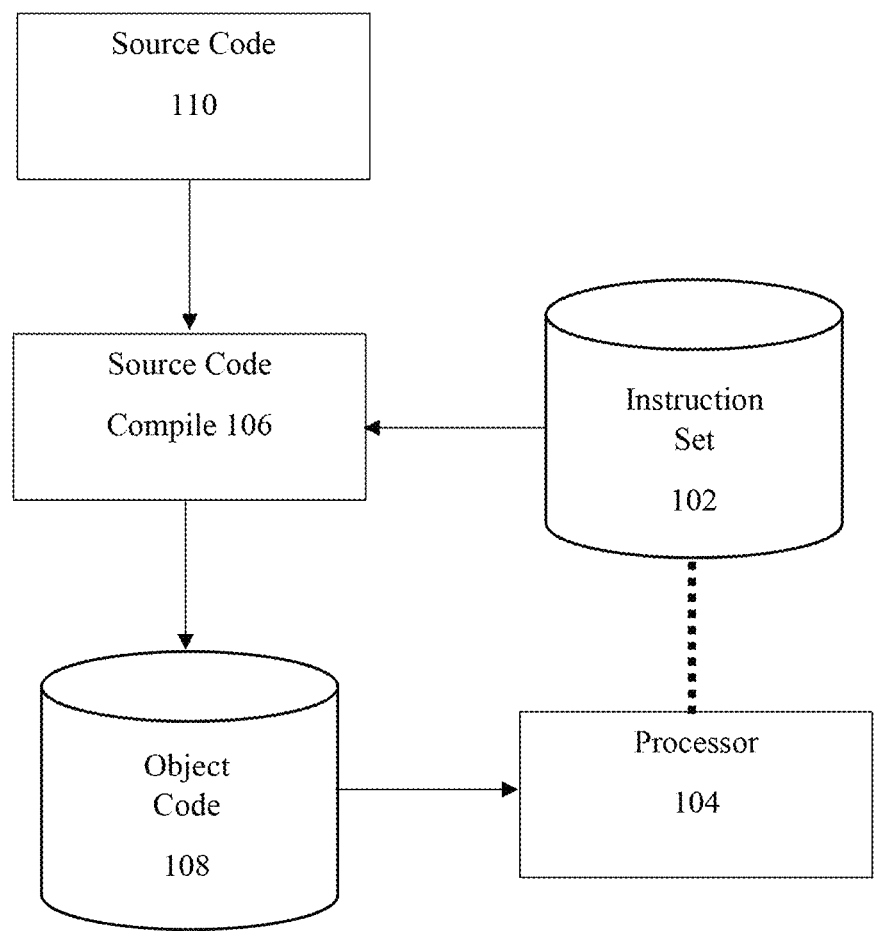
FIGS. 1A and 1B are functional block diagrams illustrating example aspects of a method and apparatus of encoding an instruction set for a processor architecture according to embodiments.

These and other aspects are further illustrated in connection with FIGS. 1A and 1B. As shown in FIG. 1A, an instruction set 102 for a processor 104 is used by a source code compiler 106 to generate object code 108 for a particular software application comprised of, or written in, source code 110. When source code 110 for a particular application is compiled into object code 108, it can be executed by the target processor 104 during run-time to perform the desired application.

As set forth above, when target processor 104 is a general-purpose processor (e.g. x86 processor, etc.), the number of instruction formats and instructions in each format is relatively small. Moreover, the instruction set 102 of a general-purpose processors is quite stable and once it is defined and it doesn't change much. So it is possible to design instruction formats and assign opcodes to each instruction manually and with minimal automation. The mapping of instructions to an opcode space is done by experience and intuition, and so no algorithms or automatic tools are needed.

Conversely, for a domain specific architecture, such as those including an extensible and/or configurable processor and/or digital signal processor as target processor 104, the instruction set 102 can vary depending on the particular application. Moreover, the instruction set can be very large, with many complex and specific instructions with various formats, operands, sizes, etc. So the process of encoding the instruction set in an optimal way can be very challenging, and a manual approach is usually time-consuming and inefficient.

Figure 1B:
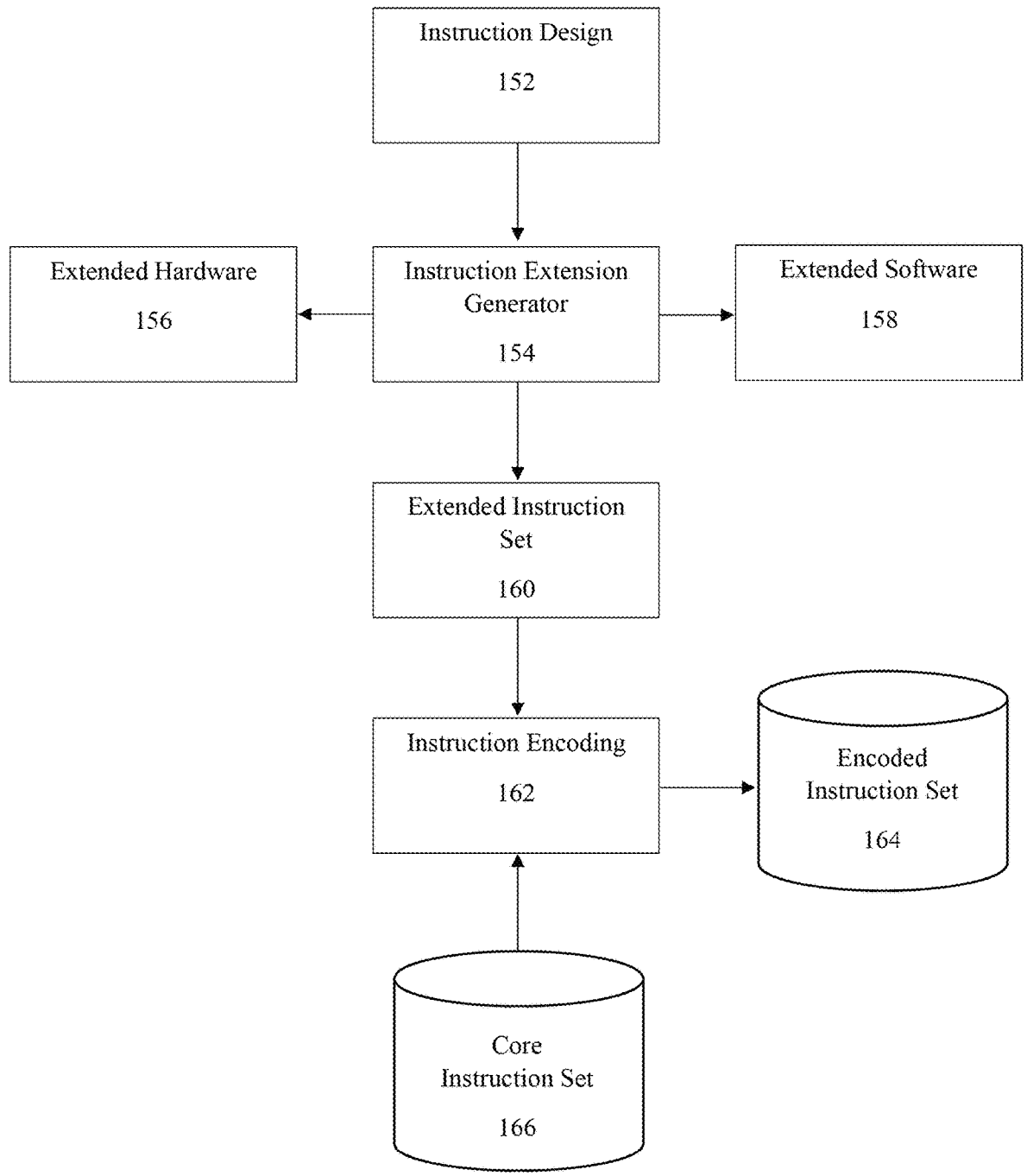

FIG. 1B illustrates further aspects of encoding an instruction set for a domain-specific architecture according to embodiments. As shown in FIG. 1B, instructions are designed in 152 and these designed instructions are provided to an instruction extension generator/compiler 154. Generator 154 generates extended hardware 156 (e.g. Verilog descriptions of hardware), extended software 158 (e.g. software tools, debuggers, compilers, etc.) and an extended set of instructions 160 (e.g. list of designed instructions). An instruction encoding process 162 according to embodiments is used to generate an encoded instruction set 166.

As further shown in FIG. 1B, some domain-specific architectures can include a core instruction set (e.g. core ISA). These core instructions can also be provided to the instruction extension generator/compiler 154 and used to generate the core instruction set 166, which is then encoded along with the extended instruction set 160 into the final encoded instruction set 164 for the target processor. Although these elements 154, 160, 162 and 166 are shown separately for illustrating certain aspects of the present embodiments, some or all of them can be implemented in a common platform. For example, in some embodiments, instruction encoding 162 can be incorporated into instruction extension generator/compiler 154. These and other variations will be apparent to those skilled in the art after being taught by the present examples.

In embodiments, a system including one or more modules shown in FIG. 1B can be implemented by one or more general purpose computers that are loaded with software (e.g., EDA tools) and/or customized to include hardware for interactively implementing physical electronic designs. In some embodiments, the one or more computing systems comprise various components not shown such as processor(s) or processor core(s), memory, disks, etc. In some embodiments, the one or more computing systems are implemented in a "cloud" configuration and/or a client/server configuration. For example, one or more server computers may be loaded with application software (e.g., a layout editor tool) for implementing some or all of the methodology of the present embodiments, and one or more client computers can communicate with the server computer(s) via a network to perform some or all of the methodology of the embodiments for a particular design.

The one or more computing systems may further write to and read from a local or remote volatile or non-volatile computer accessible storage that stores thereon data or information such as, but not limited to, extended hardware 156, extended software 158, extended instruction set 160, core instruction set 166 and encoded instruction set 164. In some embodiments, the one or more computing systems may, by various standalone software, hardware modules or combinations thereof implement an EDA tool that includes a user interface module. Although not necessary for the present embodiments, the EDA tool may further include interactive or automated modules for interactively implementing designs for integrated circuits that are not shown such as place-and-route tools, floorplanners, design rule checkers, verification engines, signal and power integrity checkers, etc. as will be appreciated by those skilled in the art. In other embodiments, the EDA tool is a standalone application that only includes functionality such as that shown in FIG. 1B. In these and other embodiments, a user can interact with instruction design 152 via interface devices (e.g., mouse, trackball, touchpad, touchscreen, etc.) and user interfaces (e.g. menus, controls, list boxes, dialogue boxes, etc.), and displays them to the user via user interface devices (e.g., display monitor).

In embodiments, instruction set encoding includes both operand encoding and opcode encoding. For operand encoding, the instruction to be encoded is identified and then the operand of that instruction is encoded. For opcode encoding, the instructions can be encoded either separately or together, and the selection of which instructions to encode together is made based on certain criteria. The operand encoding can be done before opcode encoding or done together with opcode encoding. In example embodiments described below, operands and opcodes are encoded in separate iterations however these examples are not limiting, and those skilled in the art will understand how to perform encoding of operands and opcodes in other orders and combinations after being taught by these examples.

Figure 2:
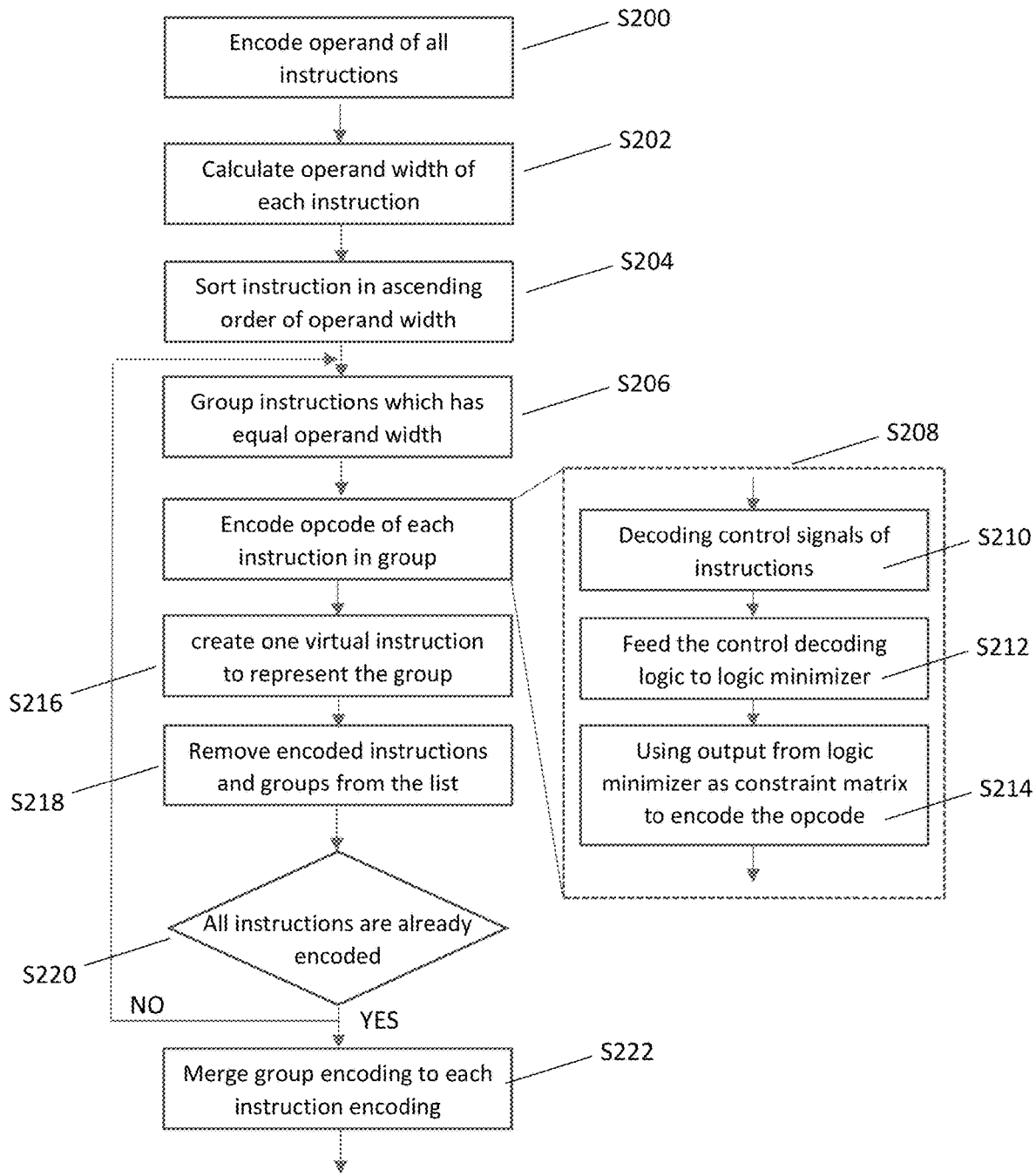
FIG. 2 illustrates an example method for encoding a processor instruction set automatically in an optimal way in accordance with embodiments.

FIG. 2 illustrates one example method for automatically encoding a processor instruction set according to embodiments.

In the example of FIG. 2, operand encoding is done before opcode encoding. Accordingly in S200, operand encoding of all instructions in the instruction set is performed. An example process for performing operand encoding according to embodiments is described in more detail below in connection with FIGS. 3 to 5. However, this example is not limiting and many alternative processes are possible in accordance with embodiments.

After operand encoding is performed, in addition to the original list of instructions in the instruction set, there exists a set of assigned operand bits for each instruction in the instruction set. In S202, the number of bits to encode operand is calculated for each instruction and then in S204 the instructions are sorted based on the number of bits needed by operands. From this initial sorted list, the encoding process is started with instructions having the smallest operand width (i.e. the fewest number of operand bits).

In S206 at least two instructions with the smallest operand width are grouped together. One instruction having a minimal operand width is first identified, and any other instructions having an operand width which equals this minimal operand width are also identified and added to the group. If only one instruction having the minimal operand width is identified in the list, then one or more instructions having the next largest operand width in the list are also included in the group. For example, if instruction A is the only instruction in the list with an operand width of 10 or less, and if instruction B in the list has operand width 11, they are grouped together. If there is another instruction C in the list that also has operand width 11, then Instruction A, B and C are grouped together.

If there are only two instructions in the group, S208 can include a simple scheme to encode the opcodes in this group: the first instruction has opcode=1'b0 and the second instruction has opcode=1'b1. Otherwise, a more general example process of encoding the opcodes for a group of instructions that has been identified in step S206 is represented by S208 in FIG. 2, and is described in more detail in connection with FIGS. 6 to 10. In example embodiments such as those shown in FIG. 2 and described below, a logic minimizer is used in this encoding process. One such logic minimizer that can be used in embodiments is known in the art as the Espresso heuristic logic minimizer. In these and other embodiments, the logic minimizer can incorporate an encoding method proposed by G. De Micheli in "Optimal State Assignment for Finite State Machine", IEEE Transactions on Computer-Aided Design, Vol. CAD-4. No. 3, July 1985.

FIG. 2 further illustrates an example of processing performed in S208 in these and other embodiments for a group of two or more instructions having the same or similar operand width. First in S210, embodiments derive the control logic for each instruction in the instruction group. The decoded control signal for each instruction can be the register file port read enable or write enable, as just one example. The input of the decoding logic is 1-hot encoding of all instructions in the group, the outputs of the decoding logic are all of the control signals (read enable, write enable of all register file ports and the other control signals). In S212, the decoding logic is fed to the logic minimizer and the decoding logic output from the logic minimizer will have much fewer terms. The new input obtained from the logic-minimized decoding logic is the constraint matrix to encode opcodes of all instructions in the group. An encoding satisfying the constraint matrix for all instructions in the group is then determined in S214.

After all instructions in the group have been encoded in S208, S216 proceeds to create one virtual instruction to represent the whole group and all the bits used to encode all instructions in that group is treated as the new operand width of that virtual instruction. All instructions in the group are removed from the sorted instruction list (obtained after S204) in S218 and the new virtual instruction is inserted into the instruction list and the encoding process is repeated (e.g. S206 to S218) until all instructions including virtual instructions have been encoded as determined in S220.

In S222, after all instructions have been encoded, the final encoded instruction set is generated by merging the virtual group encoding with all instructions in the groups (i.e. replacing the virtual instructions with the set of instructions in the corresponding group).

Figure 3:
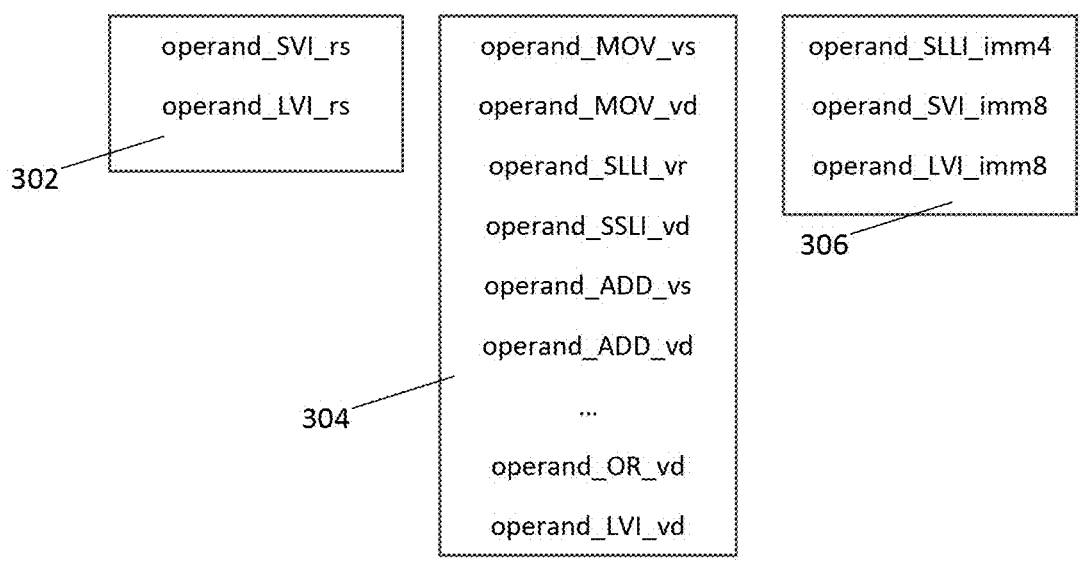
FIG. 3 illustrates an example method of grouping instructions for operand encoding according to embodiments.

As set forth above, embodiments can perform operand encoding separately from opcode encoding, with one example of opcode encoding according to embodiments being described above in connection with FIG. 2. In connection with operand encoding (e.g. performed in S200 as shown in FIG. 2), FIG. 3 illustrates example aspects of how embodiments can group operands for encoding. In the illustrated embodiments, operands are grouped by register file: all instructions having operands from/to the same register file are grouped together. As shown in this example, group 302 includes all instructions in the identified list of instructions with register file r as a source or destination operand and group 304 includes all instructions with register file v as a source or destination operand. All instructions with immediate operands are in another group (e.g. 306). The notation of opnd_LVI_rs means the operand rs of instruction LVI.

According to further aspects of operand encoding such as can be performed in S200 of FIG. 2, these and other embodiments first map all operands of each instruction group to a register file port. The operands mapped to the same register file port will be assigned to the same bit field as much as possible. If any operand mapped to the same register file port is already encoded, the new operand mapped to the same register file port will be allocated the same bit field as much as possible. If no operand mapped to the same register file port is encoded yet, a new bit field is allocated to the new operand.

Figure 4:
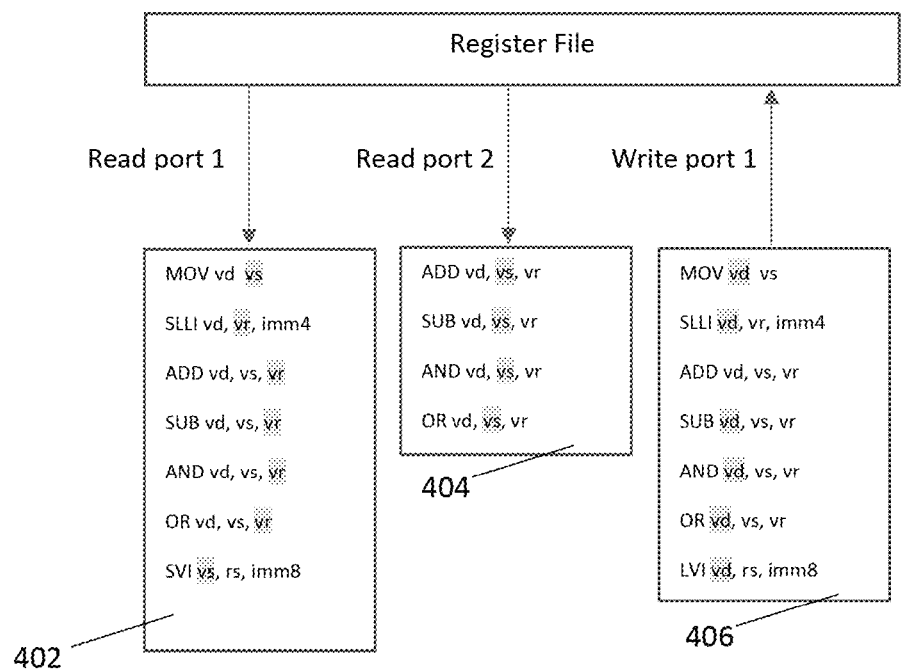
FIG. 4 illustrates an example method of mapping instruction operands to register file ports according to embodiments.

FIG. 4 illustrates one example of how operands can be mapped to a read port or write port of a register file according to embodiments. Using the example instructions shown in FIG. 3, the operands vr, vs and vd are associated with register file v and operand rs is associated with register file rs. FIG. 4 only shows the operand to register file port mapping for register file v. For example, instruction ADD vd, vs, vr which adds operand vr to operand vs and saves the result to operand vd. In this example, operand vr is mapped to read port 1 (instructions in group 402) and operand vs is mapped to read port 2 (instructions in group 404) and operand vd is mapped to the write port (instructions in group 406).

Figure 5:
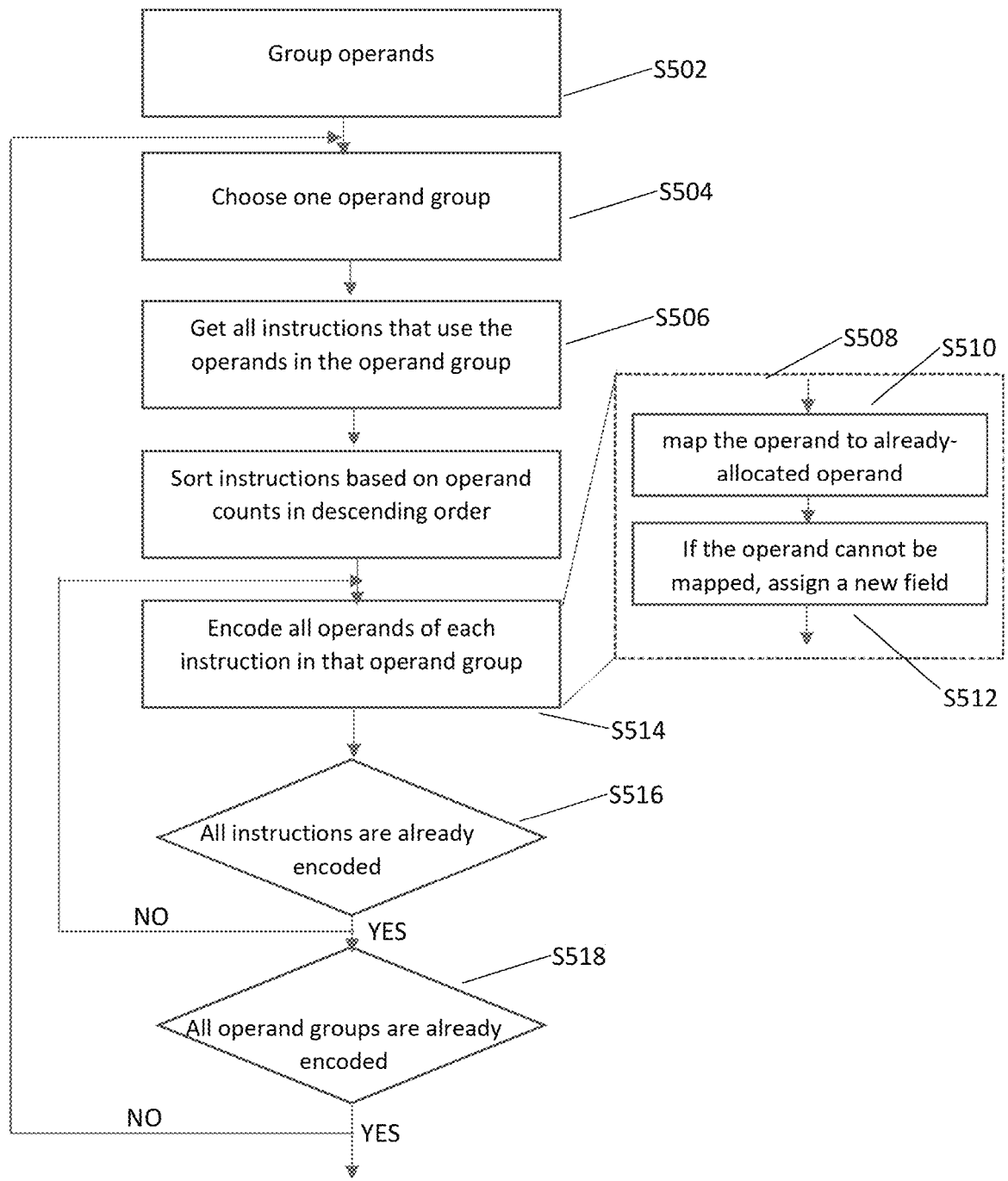
FIG. 5 illustrates an example operand encoding process for an instruction set according to embodiments.

Having described these aspects, FIG. 5 illustrates one example operand encoding process according to these and other embodiments. After operands have been grouped in S502 as shown in FIG. 3, one group of operands to encode is chosen in S504. For example, encoding can start with register file operands such as those in register file operand group 302 or 304 rather than immediate operand group 306. In register file group 302 there are two operands: opnd_LVI_rs and opnd_SVI_rs. So in the process of encoding all operands in the operand group, identifying all instructions that use those operands in S506 would include identifying two instructions: LVI and SVI.

In S508, the instructions in the group are sorted in descending order based on how many operands that instruction has. In the example of group 302, LVI has only one operand rs in that operand group and SVI is the same. In this example, encoding starts with instruction LVI from group 302. As shown in the example of FIG. 5, encoding all of the operands for an instruction includes further processing associated with S510 for each operand. In the example of encoding operands for LVI in group 302, the processing of encoding the operand includes the operand rs. To encode operand rs, S512 includes finding the register file read port that operand rs is mapped to and then identifying all operands which are mapped that port. If there is any operand in that list is already encoded, an attempt is made in S512 to assign the same encoding to the current operand. In the example of group 302 (e.g. opnd_LVI_rs in this example), opnd_SVI_rs is mapped to same register port as opnd_LVI_rs but opnd_SVI_rs is not encoded yet, so new bits are allocated for operand opnd_LVI_rs in S514. Any bits which are not occupied by the other operands in instruction LVI can be used. Obviously, bit [3:0] is not occupied and bit [3:0] can be assigned to operand vs in instruction LVI. After operand encoding of one instruction is done for a group, processing for S510 moves to the next instruction in the group. Moving from instruction LVI to instruction SVI in the example of group 302, the operand rs is mapped to the register port as operand rs of instruction LVI which is already encoded. So S512 includes an attempt to map the same encoding, and so S512 assigns bit [3:0] to opnd_SVI_rs too. In the example of group 302, there are two instructions which have operands from operand group of addressing register file r. Those two instructions have been encoded and so in this example, processing for S510 has been completed.

After S510 is completed for one operand group, it is determined in S516 and S504 to move to the next operand group. In the example of FIG. 3, this is operand group 304 of register file v. S506 includes identifying all instructions which have operands in operand group 304 of register file v, and FIG. 3 illustrates an example of all the instructions that are in that list. That instruction list is sorted based on the number of operands from the current encoding operand group in S508. In this example, ADD vd, vs, vr has three operands from the current encoding operand group. Instructions SUB/AND/OR also have three operands from the current encoding operand group. In one example, S510 starts with instruction ADD and then proceeds to encode all operands from the current encoding operand group 304 one by one. For example, S510 first encodes operand vs (S510 can also encode vr first, but the order is not important), using a similar process as described above in connection with the example of encoding opnd_LVI_rs and opnd_SVI_rs. First, S512 tries to map vs to an existing operand encoding. In this example, S512 cannot map vs to an existing encoding and so S514 just allocates any available bits for opnd_ADD_vr, which is bit [4:0]. Similarly, the encoding for opnd_ADD_vs is bit [9:5] and the encoding for opnd_ADD_vd is [14:10]. Instruction ADD/SUB/AND/OR have the same operand encoding. After all instructions in operand group of register file v is encoded as determined in S516, it is determined in S504 to move to the immediate operand group (group 306 in the example of FIG. 3). After all operand groups are encoded as determined in S518, the operand encoding for the example of FIG. 3 is shown as below:

[3:0] (opnd_LVI_rs)
[3:0] (opnd_SVI_rs)
[8:4] (opnd_SVI_vr)
[14:10] (opnd_LVI_vr)
[4:0] (opnd_ADD_vs)
[9:5] (opnd_ADD_vr)
[14:10] (opnd_ADD_vd)
[4:0] (opnd_SLLI_vr)
[14:10] (opnd_SLLI_vd)
[4:0] (opnd_NEG_vr)
[4:0] (opnd_MOV_vr)
[14:10] (opnd_NEG_vd)
[14:10] (opnd_MOV_vd)
[16:15, 9:4] (opnd_LVI_imm8)
[16:9] (opnd_SVI_imm8)
[8:5] (opnd_SLLI_imm4)

Figure 6:
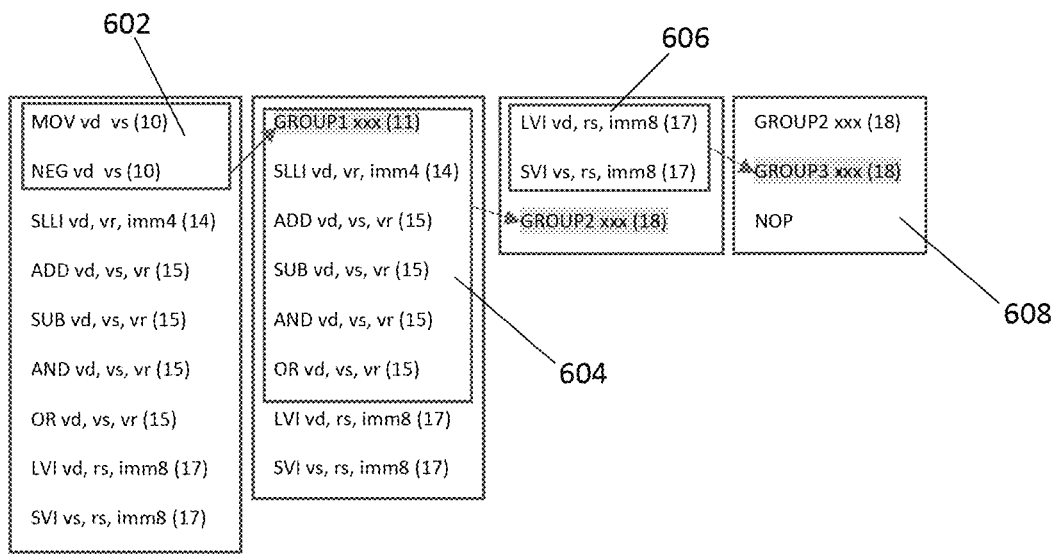
FIG. 6 illustrates an example process of grouping instructions for opcode encoding according to embodiments.

Having described one example of operand encoding that can be performed in S200 of FIG. 2, and returning to the example opcode encoding process of FIG. 2, FIG. 6 shows one example of how embodiments can group instructions into groups in one example implementation of S206. The size of the instruction set is not limited, and a small example list of instructions (e.g., the example instructions described above in connection with FIGS. 3 and 4) is used to illustrate the process.

In the first iteration of S206 of the encoding process, instructions MOV and NEG are grouped together in group 602 where MOV has 10-bits operand width and NEG has 10-bits operand width as well, and in S216 it is given the virtual instruction name GROUP1. It should be noted that NOP is a special instruction, an embodiments only encode it at the end even though NOP has 0-bit operand. As should be apparent, 11-bits are needed to encode all the instructions in GROUP1 (10-bits to encode operands and 1-bit to encode opcodes). After MOV and NEG in GROUP1 have been encoded, S218 includes removing them from the instruction list and inserting a new virtual instruction GROUP1 with 11-bits operand width into the instruction list.

In the second iteration of S206 of the encoding process, virtual instruction GROUP1 and instructions SLLI/ADD/SUB/AND/OR are grouped together in group 604, and after encoding, S216 includes creating virtual instruction group GROUP2. In the third iteration of S206 of encoding process, operands are encoded for instruction LVI and SVI, which are grouped together in group 606. After encoding, S216 includes creating virtual instruction GROUP3 containing group 606 instructions.

Figure 7:
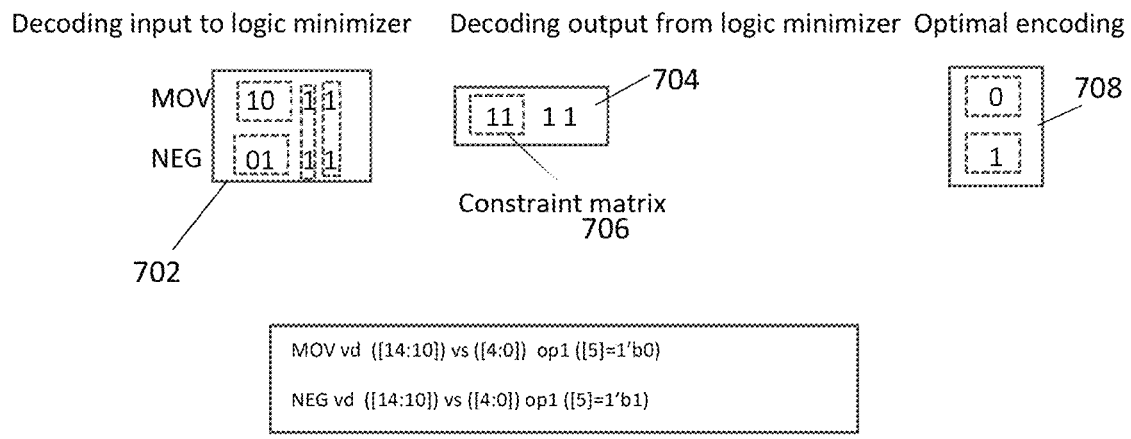
Figure 8:
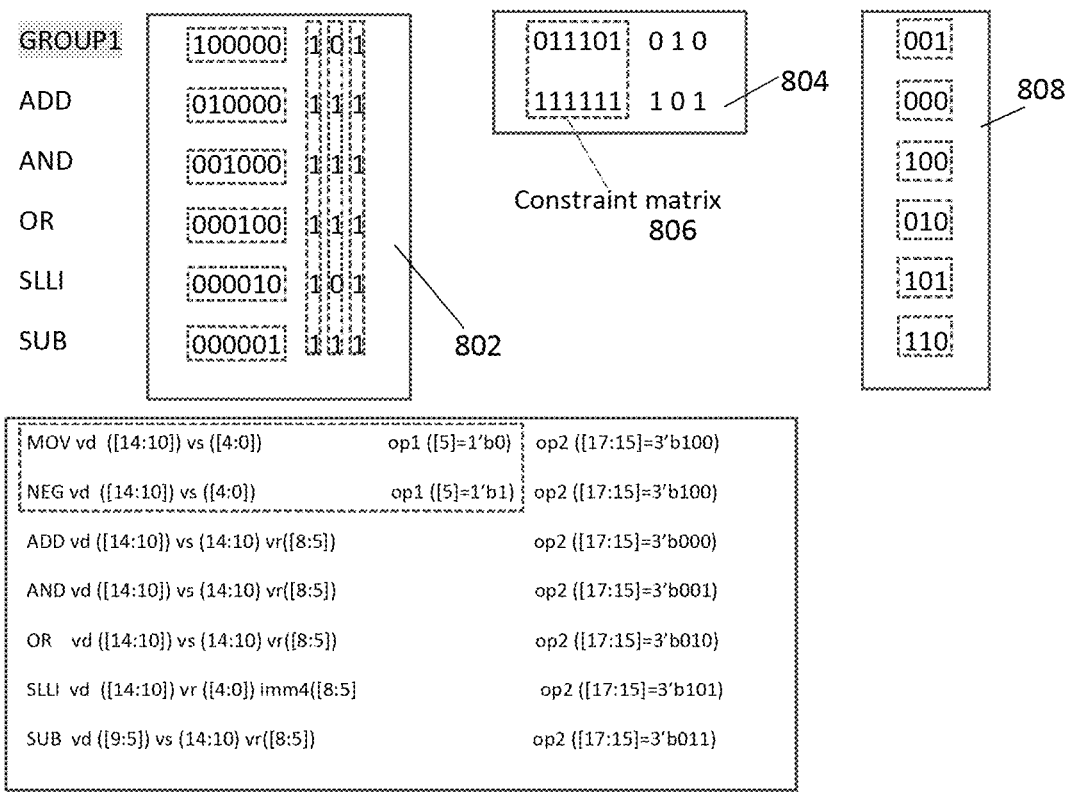
Figure 9:
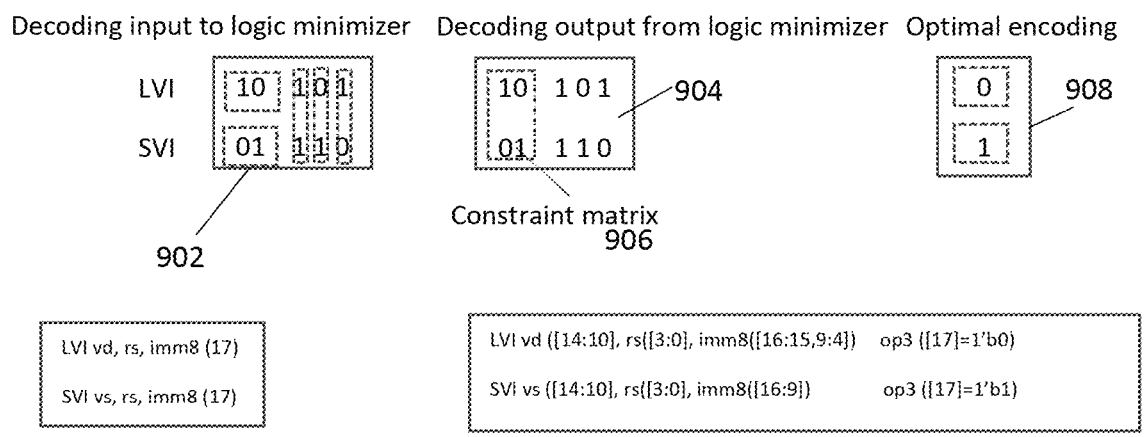

FIGS. 7, 8 and 9 show example aspects of actions performed during instruction encoding such as those described in connection with S208 in FIG. 2.

More particularly, FIG. 7 shows an example of actions performed for the instructions identified in the first iteration of S208 for the example instruction set illustrated in connection with FIG. 6 (e.g. the MOV and NEG instructions of group 602). In this example, the operand vs of the instructions is mapped to bits [4:0] and operand vd of the instructions is mapped to bits [14:10]. There are two control signals, one is the read enable of operand vs and the other is the write enable of operand vd. The control decoding logic is shown in 702 of FIG. 7 and below:

input output
MOV 10 11
NEG 01 11

As shown in this example, S210 determines that the control decoding inputs for the instructions (MOV, NEG)—which are using 1-hot encoding—are as shown: 10 for MOV and 01 for NEG. As further shown above and in 702, for the MOV instruction, the read enable of operand vs is 1 and the write enable of operand vd is 1, so the decoding output for MOV instruction is "11". Likewise, the decoding output for the NEG instruction is "11" also.

Referring back to the example encoding process of FIG. 2, S212 includes feeding the control decoding logic 702 to a logic minimizer such as ESPRESSO. The output 704 from logic minimizer is shown in FIG. 7 and below:

input output
11 11

The input can be interpreted as a positional cube notation, where the instruction MOV is represented by a "1" in the first position and instruction NEG is represented by a "1" in the second position. The input of minimized control decoding logic is the constraint matrix 706:

[1 1]

In the example encoding process of FIG. 2, S214 includes finding the encoding to satisfy the constraint matrix, which as shown in 708 can be

MOV: 0
NEG: 1

After both operands and opcodes are encoded, the final encoding 710 is shown in FIG. 7 and below:

MOV vd ([14:10]) vs ([4:0]) op1 ([5]=1'b0)
NEG vd ([14:10]) vs ([4:0]) op1 ([5]=1'b1)

As set forth previously, the operand vs occupies bit field [4:0] and operand vd occupies bit field [14:10], the opcode op1 occupies bit field [5]. In total, 11 bits are needed to encode instruction MOV and NEG. Since there are two instructions in the group, the encoding process for this example is rather trivial, and the selected encoding is similar to a result obtained in the traditional way. Nevertheless, this example illustrates aspects of the embodiments, which can be readily extendable to more complex examples by those skilled in the art. Bit "0" is assigned to the first instruction and bit "1" is assigned to the second instruction.

FIG. 8 shows an example of actions performed for the instructions identified in the second iteration of S208 for the example instruction set illustrated in connection with FIG. 6 (e.g. the virtual instruction GROUP1 and other instructions of group 604).

In this example, as in the previous example, the operand vs of the instructions is mapped to bits [4:0] and operand vd of the instructions is mapped to bits [14:10]. Further, the operand vr is mapped to bits [8:5] There are three control signals, one is the read enable of operand vs, one is the write enable of operand vd, and the third is the read enable of vr. The control decoding logic is shown in 802 of FIG. 8. As in the previous example, S210 determines that the control decoding inputs for the instructions (the six instructions of group 604)—which are using 1-hot encoding—are as shown in 802. As further shown in 802, for all instructions other than the GROUP1 and SLLI instructions, the read enable of operand vs is 1, the write enable of operand vd is 1, and the read enable of vr is 1. Otherwise, for the GROUP1 and SLLI instructions, the read enable of vr is 0.

As in the first iteration of encoding process, a logic minimizer is involved in connection with S212, with decoding output from 802 shown in 804. And the constraint matrix 806 from the output 804 of the logic minimizer is shown in FIG. 8 and below as:

011101
111111

In the example process of FIG. 2, S214 finds the encoding 808 that satisfies this constraint matrix, which can be 001
000
100
010
101
110

Three bits are needed to encode the new opcode op2, and in this example bit field [17:15] is used to encode the new opcode op2.

After this iteration of encoding process, the final encoding from 808 of the encoded instructions are shown in 810 of FIG. 8 and below:

| | | |
|---|---|---|
| MOV vd ([14:10]) vs ([4:0]) | op1 ([5]=1'b0) | op2 ([17:15]=3'b100) |
| NEG vd ([14:10]) vs ([4:0]) | op1 ([5]=1'b1) | op2 ([17:15]=3'b100) |
| ADD vd ([14:10]) vs (14:10) vr([8:5]) | | op2 ([17:15]=3'b000) |
| AND vd ([14:10]) vs (14:10) vr([8:5]) | | op2 ([17:15]=3'b100) |
| OR  vd ([14:10]) vs (14:10) vr([8:5]) | | op2 ([17:15]=3'b010) |
| SLLI vd ([14:10]) vr ([4:0]) imm4([8:5]) | | op2 ([17:15]=3'b101) |
| SUB vd ([9:5]) vs (14:10) vr([8:5]) | | op2 ([17:15]=3'b110) |

It should be noted that the bit order in the opcode selection is from LSB to MSB. For example, "011" means bit [0] is "0", bit [1] is "1" and bit [2] is "1" and the encoding is [17:15]=3'b110.

FIG. 9 shows an example of actions performed for the instructions identified in the third iteration of S208 for the example instruction set illustrated in connection with FIG. 6 (e.g. the immediate instructions of group 606). In this example, there are only two instructions in the instruction group and the encoding process is simple, with the decoding logic 902 found in S210, decoding output 904 and constraint matrix 906 from logic minimizer found in S212, encoding 908 from S214 shown in FIG. 9. As can be seen, only one bit is needed to encode the new opcode field op3, which results in the final encoding from 908:

LVI vd ([14:10], rs([3:0], imm8([16:15,9:4]) op3 ([17]= 1'b0)

SVI vs ([14:10], rs([3:0], imm8([16:9]) op3 ([17]=1'b1)

FIG. 10 shows an example of actions performed for the instructions identified in the last iteration of S208 for the example instruction set illustrated in connection with FIG. 6 (e.g. the virtual instructions GROUP2 and GROUP3, and the NOP instruction of group 608). FIG. 10 shows the decoding logic 1002 found in S210, decoding output 1004 and constraint matrix 1006 from logic minimizer found in S212, and encoding 1008 from S214 for this final group 608. The final encoding results for all instructions in the example instruction set of FIG. 6 are shown as below:

| | | |
|---|---|---|
| LVI vd ([14:10], rs([3:0], imm8([16:15,9:4]) | op3 ([17]=1'b0) | op4 ([19:18]=2'b10) |
| SVI vs ([14:10], rs([3:0], imm8([16:9]) | op3 ([17]=1'b1) | op4 ([19:18]=2'b01) |
| MOV vd ([14:10]) vs ([4:0]) op1 ([5]=1'b0) | op2 ([17:15]=3'b100) | op4 ([19:18]=2'b00) |
| NEG vd ([14:10]) vs ([4:0]) op1 ([5]=1'b1) | op2 ([17:15]=3'b100) | op4 ([19:18]=2'b00) |
| ADD vd ([14:10]) vs (14:10) vr([8:5]) | op2 ([17:15]=3'b000) | op4 ([19:18]=2'b00) |
| AND vd ([14:10]) vs (14:10) vr([8:5]) | op2 ([17:15]=3'b100) | op4 ([19:18]=2'b00) |
| OR  vd ([14:10]) vs (14:10) vr([8:5]) | op2 ([17:15]=3'b010) | op4 ([19:18]=2'b00) |
| SLLI vd ([14:10]) vr ([4:0]) imm4([8:5] | op2 ([17:15]=3'b101) | op4 ([19:18]=2'b00) |
| SUB vd ([9:5]) vs (14:10) vr([8:5]) | op2 ([17:15]=3'b110) | op4 ([19:18]=2'b00) |
| NOP | | op4 ([19:18]=2'b01) |

The final opcode encoding results for this example instruction set can be written as NOP [19:18]=2'b10
ADD [19:15]=5'b00000
AND [19:15]=5'b00001
LVI [19:17]=3'b010
MOV [19:15, 5:5]=6'b001000
NEG [19:15, 5:5]=6'b001001
OR [19:15]=5'b00010
SLLI [19:15]=5'b00101
SUB [19:15]=5'b00011
SVI [19:17]=3'b011

All instructions in the example embodiments (e.g. the instructions shown in the above examples) can be obtained from descriptions that have been made by an instruction designer for a target configurable/extensible processor. One example set of descriptions is shown in FIGS. 11A to 11C. FIG. 11A identifies the descriptions for the LVI (1102), SVI (1104) and MOV (1106) instructions used in the above examples, and the descriptions for the other example instructions used in the above examples can be identified in FIGS. 11A to 11C by those skilled in the art. These example descriptions are shown in the example where the target processor architecture uses a TIE (Tensilica Instruction extension) language. In these and other examples, the encoding is not specified for any instruction and so the encoding can be generated from the algorithm described in the present examples.

After this example instruction set has been encoded using a conventional technique, the decoding module can be written in Verilog as shown in FIGS. 12A and 12B, where control signal rdm_usen_Ck means the data read from m read port will be used at cycle n and the decoding is done in cycle k. for example, rd0_use10_C0 means the data from read port 0 will be used at cycle 10 and the decoding is done in cycle 0. Control signal wrm_defn_Ck means the data for write port m will be available at cycle n and the decoding is done in cycle k. In the example, we have two register files, the register file v and register file r. The decoding of register file v is more complicated, and we use the decoding logic of register file v as example to show the area difference.

By comparison, after encoding the instruction set using the new encoding algorithm of the present embodiments, the decoding module can also be written in Verilog, an example of which is shown in FIGS. 13A and 13B. For the decoding in the RTL, the four lowest significant bits are used to identify the instruction length which is 32-bit for this example and it is always [3:0]==4'b1110. The opcode and operand encoding start from fifth bit. For example, the opcode encoding of ADD is ADD [19:15]==5'b00000 which needs 20-bits and starts from bit 5 in instruction buffer, for example as follows:

ADD InstBuf[23:19]==5'b0000 InstBuf[4:0]=4'b1110

The instruction length is 32-bits in this example and the RTL decoding (e.g. 1302 in FIGS. 13A and 13B) is ({InstBuf_C0[31:19], InstBuf_C0[3:0]}==17'h0000e When these two decoding modules generated from the old algorithm (FIGS. 12A and 12B) and new algorithm (FIGS. 13A and 13B) are separately synthesized with TSMC 28HPC library, the resulting area is shown in the below TABLE 1. The new algorithm showed 6% area reduction.

TABLE 1

| Old Area (um$^2$) | New Area (um$^2$) | Area reduction |
|---|---|---|
| 29.5 | 27.7 | 6.1% |

One major difference between how instructions are encoded conventionally and in the present embodiments is how the encoding bits are assigned. For example, when assigning encoding bits to an instruction set having six instructions such as: GROUP1, ADD, AND, OR, SLLI, SUB, the traditional way is to merely encode these instructions sequentially from a set of 3 bits ($2^3$=8) as shown in the below example:

000—GROUP1
001—ADD
010—AND
011—OR
100—SLLI
101—SUB

For the algorithm in the present embodiments, a logic minimizer can be used, and the optimal encoding is selected based on the constraint matrix, and that selection of encoding will guarantee the minimization of decoding area, as in the following example:

001—GROUP1
000—ADD
100—AND
010—OR
101—SLLI
110—SUB

The herein described subject matter sometimes illustrates different components contained within, or connected with, different other components. It is to be understood that such depicted architectures are illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably coupleable," to each other to achieve the desired functionality. Specific examples of operably coupleable include but are not limited to physically mateable and/or physically interacting components and/or wirelessly interactable and/or wirelessly interacting components and/or logically interacting and/or logically interactable components.

With respect to the use of plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It will be further understood by those within the art that if a specific number of an introduced claim recitation is intended, such an intent will be explicitly recited in the claim, and in the absence of such recitation, no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general, such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Further, unless otherwise noted, the use of the words "approximate," "about," "around," "substantially," etc., mean plus or minus ten percent.

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A method to encode an instruction set of a domain-specific processor, wherein the encoded instruction set is used by a compiler to generate object code for execution by the domain-specific processor, the method comprising:
    identifying a set of instructions for the domain-specific processor, wherein the set of instructions include a core set of instructions for execution by a core instruction set architecture of the domain-specific processor and an extended set of instructions for execution by extended hardware of the domain-specific processor, and wherein the extended set of instructions and extended hardware are generated by an instruction extension generator in response to instruction designs provided for a target application of the domain-specific processor; and
    processing the identified set of instructions, including both the core set of instructions and the extended set of instructions, so as to generate the encoded instruction set for the domain-specific processor, wherein the encoded instruction set comprises an encoded opcode and an encoded operand for each instruction of the identified set of instructions, and wherein the encoded opcode of each instruction contains the same number of opcode bits and wherein the encoded operand of each instruction contains the same number of operand bits, the processing including:
    determining the same number of opcode bits and the same number of operand bits;
    automatically encoding operands for the identified set of instructions such that each instruction of the identified set of instructions is assigned a set of operand bits for all possible operands for the each instruction; and
    automatically encoding opcodes for the identified set of instructions such that each instruction of the identified set of instructions is assigned a unique sequence of opcode bits.

2. The method of claim 1, wherein the operands and opcodes are encoded at the same time.

3. The method of claim 1, further comprising automatically grouping instructions into a plurality of different groups for the encoding.

4. The method of claim 3, further comprising identifying decoding logic of control signals for each group of instructions.

5. The method of claim 4, wherein the control signals include register read enable and write enable.

6. The method of claim 4, further comprising providing the decoding logic to a logic minimizer to obtain an encoding constraint matrix.

7. The method of claim 6, wherein the encoding of each instruction in each instruction group is done using an optimal state assignment method.

8. The method of claim 1, wherein automatically encoding opcodes for the identified set of instructions includes:
    decoding control signals of the identified set of instructions;
    feeding control decoding logic to a logic minimizer; and
    using output from the logic minimizer as a constraint matrix for encoding opcodes.

9. A system for configuring a domain-specific processor, comprising:
    a memory for storing a set of instructions that have been prepared for the domain-specific processor; and an instruction encoding module configured to:
identify the set of instructions for the domain-specific processor, wherein the set of instructions include a core set of instructions for execution by a core instruction set architecture of the domain-specific processor and an extended set of instructions for execution by extended hardware of the domain-specific processor, and wherein the extended set of instructions and extended hardware are generated by an instruction extension generator in response to instruction designs provided for a target application of the domain-specific processor; and
process the set of instructions, including both the core set of instructions and the extended set of instructions, so as to generate an encoded instruction set for the domain-specific processor,
wherein the encoded instruction set is used by a compiler to generate object code for execution by the domain-specific processor, and
wherein the encoded instruction set comprises an encoded opcode and an encoded operand for each instruction of the identified set of instructions, and wherein the encoded opcode of each instruction contains the same number of opcode bits and wherein the encoded operand of each instruction contains the same number of operand bits, and
wherein the instruction encoding module is further configured to:
determine the same number of opcode bits and the same number of operand bits;
automatically encode operands for the identified set of instructions such that each instruction of the identified set of instructions is assigned a set of operand bits for all possible operands for the each instruction; and
automatically encode opcodes for the identified set of instructions such that each instruction of the identified set of instructions is assigned a unique sequence of opcode bits.

10. The system of claim 9, wherein the instruction encoding module is configured to encode the operands and opcodes at the same time.

11. The system of claim 9, wherein the instruction encoding module is further configured to automatically group instructions into a plurality of different groups for the encoding.

12. The system of claim 11, wherein the instruction encoding module is further configured to identify decoding logic of control signals for each group of instructions.

13. The system of claim 12, wherein the control signals include register read enable and write enable.

14. The system of claim 12, wherein the instruction encoding module includes a logic minimizer that receives the decoding logic and produces an encoding constraint matrix.

15. The system of claim 14, wherein the encoding of each instruction in each instruction group is done using an optimal state assignment method.

16. A computer program product comprising non-transitory computer readable media storing instructions which, when executed by a processor, cause the processor to perform method to encode an instruction set of a domain-specific processor, wherein the encoded instruction set is used by a compiler to generate object code for execution by the domain-specific processor, the method comprising:
identifying a set of instructions for the domain-specific processor, wherein the set of instructions include a core set of instructions for execution by a core instruction set architecture of the domain-specific processor and an extended set of instructions for execution by extended hardware of the domain-specific processor, and wherein the extended set of instructions and extended hardware are generated by an instruction extension generator in response to instruction designs provided for a target application of the domain-specific processor; and
processing the identified set of instructions, including both the core set of instructions and the extended set of instructions, so as to generate the encoded instruction set for the domain-specific processor, wherein the encoded instruction set comprises an encoded opcode and an encoded operand for each instruction of the identified set of instructions, and wherein the encoded opcode of each instruction contains the same number of opcode bits and wherein the encoded operand of each instruction contains the same number of operand bits, the processing including:
determining the same number of opcode bits and the same number of operand bits;
automatically encoding operands for the identified set of instructions such that each instruction of the identified set of instructions is assigned a set of operand bits for all possible operands for the each instruction; and
automatically encoding opcodes for the identified set of instructions such that each instruction of the identified set of instructions is assigned a unique sequence of opcode bits.

17. The computer program product of claim 16, wherein the method further comprises automatically grouping instructions into a plurality of different groups for the encoding.

18. The computer program product of claim 17, wherein the method further comprises identifying decoding logic of control signals for each group of instructions.

19. The computer program product of claim 18, wherein the control signals include register read enable and write enable.

20. The computer program product of claim 18, wherein the method further comprises providing the decoding logic to a logic minimizer to obtain an encoding constraint matrix.

* * * * *